United States Patent [19]

Matsui et al.

[11] Patent Number: 5,548,449
[45] Date of Patent: Aug. 20, 1996

[54] OBJECTIVE-LENS ACTUATOR

[75] Inventors: Tsutomu Matsui; Yuki Fujimura, both of Tokyo, Japan

[73] Assignee: NEC Corporation, Tokyo, Japan

[21] Appl. No.: 255,930

[22] Filed: Jun. 7, 1994

[30] Foreign Application Priority Data

Jun. 7, 1993 [JP] Japan ..................... 5-135497

[51] Int. Cl.$^6$ ..................................... G02B 7/02
[52] U.S. Cl. ................ 359/814; 359/824; 369/44.15
[58] Field of Search ................................ 359/813, 814, 359/823, 824; 369/44.15, 44.16

[56] References Cited

U.S. PATENT DOCUMENTS

| | | | |
|---|---|---|---|
| 4,669,823 | 6/1987 | Iguma et al. | 359/814 |
| 4,861,138 | 8/1989 | Suzuki | 359/814 |
| 4,998,802 | 3/1991 | Kasuga et al. | 359/814 |
| 5,018,836 | 5/1991 | Noda et al. | 359/814 |
| 5,161,067 | 11/1992 | Tomiyama et al. | 359/814 |
| 5,208,703 | 5/1993 | Ikegame et al. | 359/813 |

FOREIGN PATENT DOCUMENTS

4-319537  11/1992  Japan .

*Primary Examiner*—Loha Ben
*Attorney, Agent, or Firm*—Burns, Doane, Swecker & Mathis, L.L.P.

[57] ABSTRACT

It is the object of the invention to provide the actuator for the objective lens, suitable for the optical disc apparatus with high speed access property and high drive sensitivity especially in the track drive direction, and to solve problems concerning with manufacturing processes, by using metallic leaf springs with high reliability for supporting the lens holder to make its movements to be translation motions in both focus and tracking drive directions. The lens holder 22, a movable object, is supported by four leaf springs 21a to 21d, thereby its movements is pure translation motions in both focus and tracking drive directions. The drive sensitivity in the track drive direction is largely increased by designing and improving configurations of the magnetic circuit and the focus and tracking drive coils. For tracking drive motion, a pair of tracking drive coils are fixed to two opposite sides of the focus drive coils, and the magnetic circuit contains two plate magnets 15 and two bar magnets 16, such that the arrangement of magnets is line symmetrically with respect to the axis of the objective lens. The lens holder 22 is supported by the actuator base 11 is provided with an air gap 30, the width of which is adjustable by the aid of needle screws 19 and 20 to adjust the inclination of the lens holder 22 in the tracking and tangential directions respectively.

6 Claims, 7 Drawing Sheets

OBJECTIVE-LENS ACTUATOR

FIELD OF THE INVENTION

The invention relates to an objective-lens actuator for an optical head which is controlled to move in focus and tracking directions with high information bit rate recording.

BACKGROUND OF THE INVENTION

An optical disc apparatus for the next generation is required to operate with a large capacity of information and the high information bit rate recording. For this purpose, an objective lens for high information bit rate recording is used for an optical head, and is required to be controlled with a high speed and the high precision. Therefore, an objective lens actuator to be moved in focus and track directions must be small in size and light in weight, and must generate a driving force to overcome the disc acceleration.

As an example of conventional apparatus, we can quote the objective lens actuator which appeared on Japanese Patent Kokai No. 3-156730. The outline of the aforementioned apparatus is as follows. A focus drive coil is a rectangular-shaped one and wound around on outer periphery of a lens holder. A pair of parallel tracking drive coils are fixed to opposite sides of a focus drive coil, such that coils surface of the formers and the latter are perpendicular to each other.

The lens holder and aforementioned coils are placed in DC magnetic field caused by a pair of parallel plate magnets which are fixed to the actuator base and magnetized in opposite directions.

In operation, the current in the focus drive coil is proportional to the focus servo error signal corresponding to the focus drive direction, and the electro-magnetic force which is generated by this coils is proportional to the product of the coil current and the external magnetic flux density, i.e. the one caused by aforementioned plate magnets, and the direction of the electro-magnetic force is perpendicular to the coil surface. Therefore, the focus drive coil moves up and down corresponding to the polarity of the coil current, until the electro-magnetic force balances with restoring forces of four wires which support the lens holder. In the case of the tracking drive coils, all situations are quite similar to those of the focus drive one, however, the coils moves to the right and the left according to the servo error signal corresponding to the tracking drive direction. Thus, focus and tracking adjustments are carried out in accordance with servo error signals supplied from an optical unit, which contains various optical hardwares and produces focus and tracking error signals, and information signals.

On the aforementioned objective lens actuator, however, following disadvantages have been pointed out. The structure for four-wire-suspension which was designed to move objectives lens in two orthogonal axes causes rotational motions in focus and tracking directions. Moreover, for objective-lens actuator, it is difficult to increase the drive sensitivity of tracking drive coils, because dimensions of these coils and external DC magnetic fields acting to these coils cannot be so large, by the reasons of spacial limitations and structures of magnetic circuits respectively. Furthermore, a mechanism for adjusting initial position and attitude of the lens holder in both tracking drive and tangential (perpendicular to tracking) direction becomes complicated, when larger range of adjustment is desired.

SUMMARY OF THE INVENTION

Accordingly, it is an object of the invention to provide an actuator for an objective lens in which the drive sensitivity of the tracking drive is remarkably improved.

It is a further object of the invention to provide an actuator for an objective lens in which forces act to the lens holder cause only its translation motions in both focus and tracking drive directions.

It is a still further object of the invention to provide an objective lens actuator in which the initial position and the initial attitude of the lens holder can be easily adjusted by simple mechanism.

According to the invention, an actuator for an objective lens, comprises:

- a rectangular-shaped lens holder holding an objective lens at its center,
- a focus drive coil wound around outer periphery of the lens holder, and generating magnetic flux in a direction of focus drive,
- pair of tracking drive coils fixed to opposite sides of the focus drive coil near around apexes, such that the tracking coils are line symmetrical with respect to axis of the objective lens and generate magnetic flux in a direction perpendicular to both the focus and tracking drive directions (tangential direction, hereinafter),
- four parallel leaf springs one ends of which are fixed to the lens holder and another ends of which to a stand,
- magnetic circuit assembly consisted of permanent magnets and low magnetic reluctance members, and generating static magnetic field in circumference of the lens holder and coils,
- an actuator base supporting the magnetic circuit assembly and the stand, such that the four leaf springs can adjust inclination of the lens holder in both tracking drive and tangential directions,
- wherein, the static magnetic field is line antisymmetrical with respect to the lens axis, and in regions close to the opposite sides of the focus coil, points to tangential direction and its magnitude is nearly constant along the opposite sides, however, its direction is inverted at bisectors of the tracking drive coils, and the low magnetic reluctance members and permanent magnets hold the opposite sides of the focus drive coil between them.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
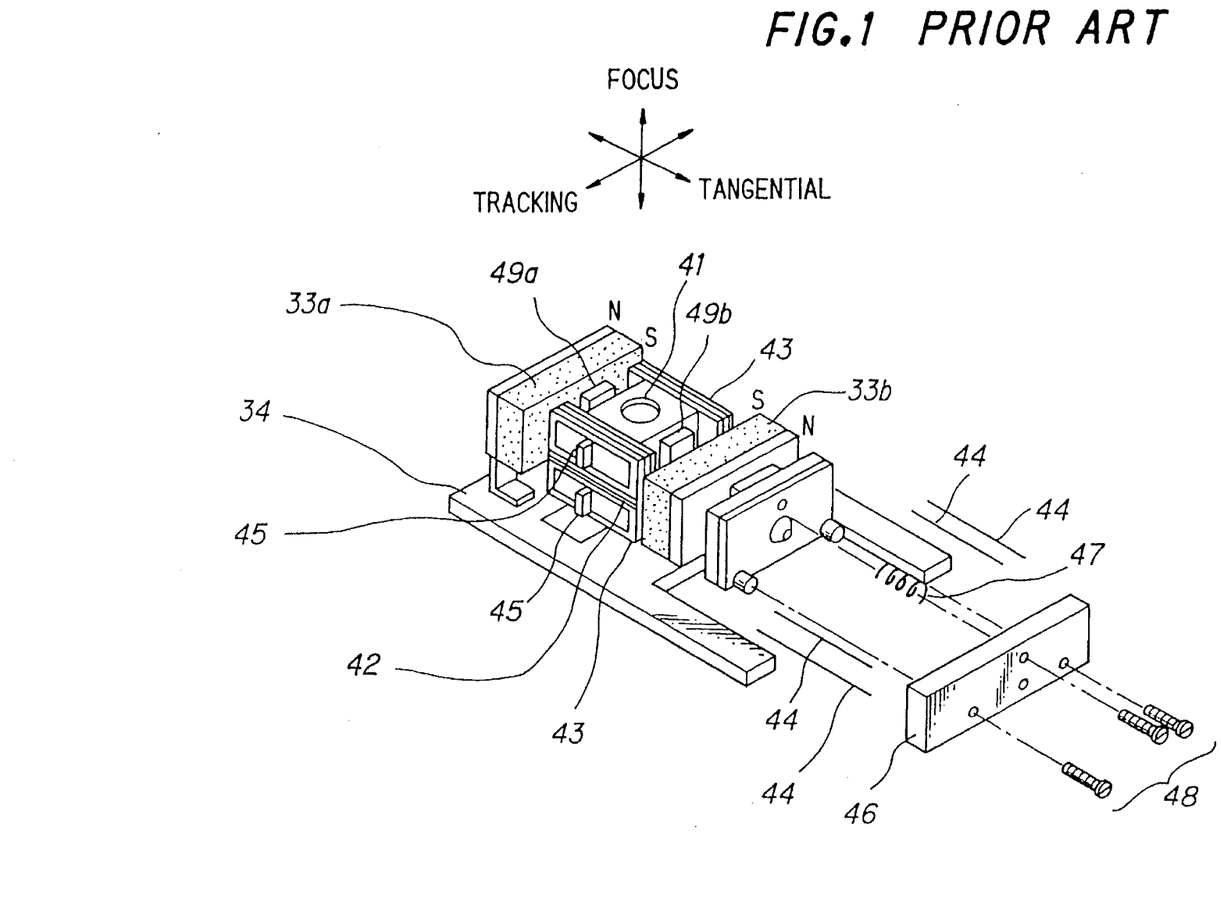
FIG. 1 is a diagram showing a whole construction and a mechanism for adjusting inclination of a lens holder in a conventional actuator.

Before explaining an actuator for an objective lens in a preferred embodiment according to the invention, the aforementioned conventional actuator for the objective lens will be again explained referring to FIG. 1. In the upper portion of FIG. 1, three directions, that is to say, the focus drive, the tracking drive, and the tangential directions, are shown by arrows. The focus drive direction is perpendicular to the optical disc (not shown), and coincides with the objective lens axis, the tracking drive direction is the radial one of the disc (not shown), and the tangential direction is the one of the tangent of the disc. In operation, the lens holder is controlled by the actuator in both the focus and the tracking drive directions; in manufacturing process, however, the initial position and the initial attitude of the lens holder are adjusted manually in the tracking drive and tangential directions.

As shown in FIG. 1, the holder 41 is approximately rectangular-shaped and hold the objective lens at its center. The focus drive coil 42 is wound around the outer periphery of the lens holder 41, and a pair of rectangular-shaped tracking drive coils 43 are fixed to both ends of lens holder, such that coils surfaces of those coils are parallel with each other and perpendicular to that of the focus drive coil. 33a and 33b are plate magnets, and magnetized in the direction of the depth, in other words, perpendicular to plate surfaces. These plate magnet 33a and 33b are arranged in parallel with each other but with opposite directions of magnetization, positioned in parallel with and close by opposite sides of the focus drive coil 42 respectively, and fixed to the actuator base 34. The lens holder 41 are also supported by the actuator base 34 through four wires 44 and four-wires-supporting member 46. The left end of each one of four wires is fixed to the lens holder 41 at four-wires-fixing positions 45, and the right end to four-wires-supporting member 46, which are supported by actuator base 34 using three screws 4a and a coil spring 47. The initial position and the initial attitude of the lens holder 41 can be adjusted in the tracking drive or tangential direction by three screws 48. 49a and 49b in FIG. 1 are magnetic flux guiding yokes (flux guide, hereinafter), and made of magnetic material.

Figures 2A, 2C:
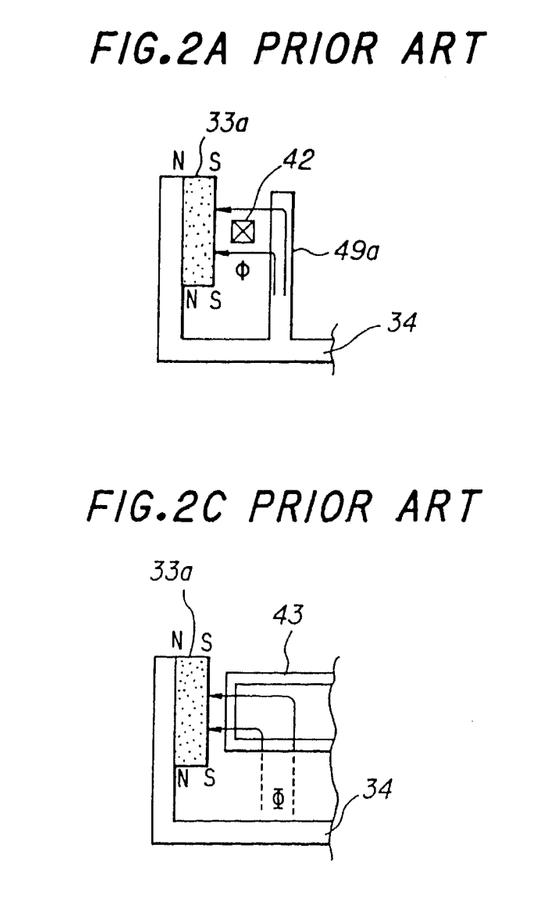
FIG. 2A and 2C show magnetic flux distributions around focus and tracking drive coils in a conventional apparatus, respectively.
Figure 2B:
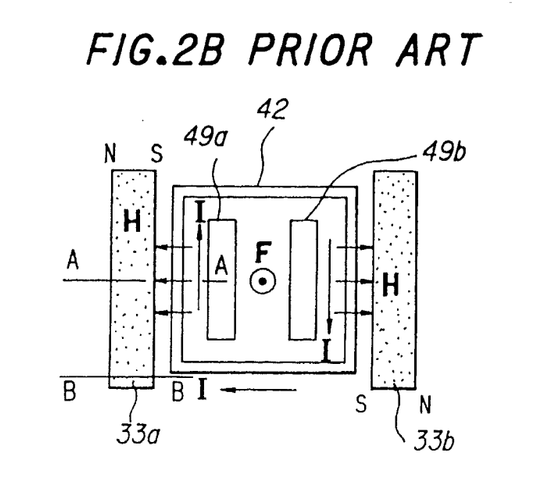
FIG. 2B and 2D show relations between magnetic fields, coil currents and electro-magnetic forces in cases of focus and tracking drive coils in a conventional apparatus respectively.

FIG. 2B is a plan view of the focus drive coil 42, where H is the external magnetic field acts to this coil, and I is the electric current in the coil conductor. F is the electromagnetic force acts to the coil, the direction of which is perpendicular to the coil surface and points to the reader according to the Fleming's left hand law. F is proportional to the product of I and H.

Figure 2D:
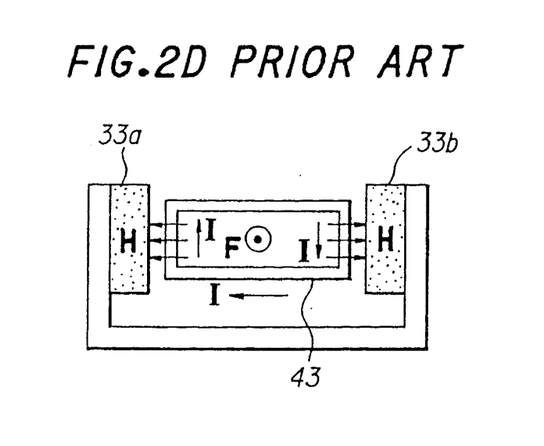

FIG. 2D is an elevation view of the tracking coil 43 and the magnetic flux meanings of H, I and F are quite similar to those in FIG. 2B.

FIG. 2A is a cross-sectional view corresponding to FIG. 2B in the A—A cross section, where φ means the magnetic flux which flows from the flux guide 49a to the plate magnet 33a. It can be easily understood that the magnetic flux density is largely increased near the flux guide 49a. Because the actuator base 34 is a part of the magnetic circuitry, the electro-magnetic force act acting to the electric current in the focus drive coil 42 is also increased.

FIG. 2C is a cross-sectional view corresponding to FIG. 2B in the B—B cross-section. The region shown in this drawing is near by the tracking drive coil 43 and the plate magnet 33a is remoted from the flux guide 49a, and thereby flux density is thin in this region. Accordingly, the electro-magnetic force act to the tracking drive coil 43 is small. Moreover, the dimension of the tracking drive coil cannot be large by spacial limitations, therefore, the drive sensitivity in the tracking drive direction is unsatisfactory. Moreover, a larger space is necessary for the four-wire-system for adjusting the initial position and the initial attitude of the lens holder in both tracking drive and tangential directions, and this system is complicated and unsuitable for the manufacturing process.

Next, an actuator for an objective lens in the preferred embodiment according to the invention will be explained referring to FIGS. 3 to 7.

Figure 3:
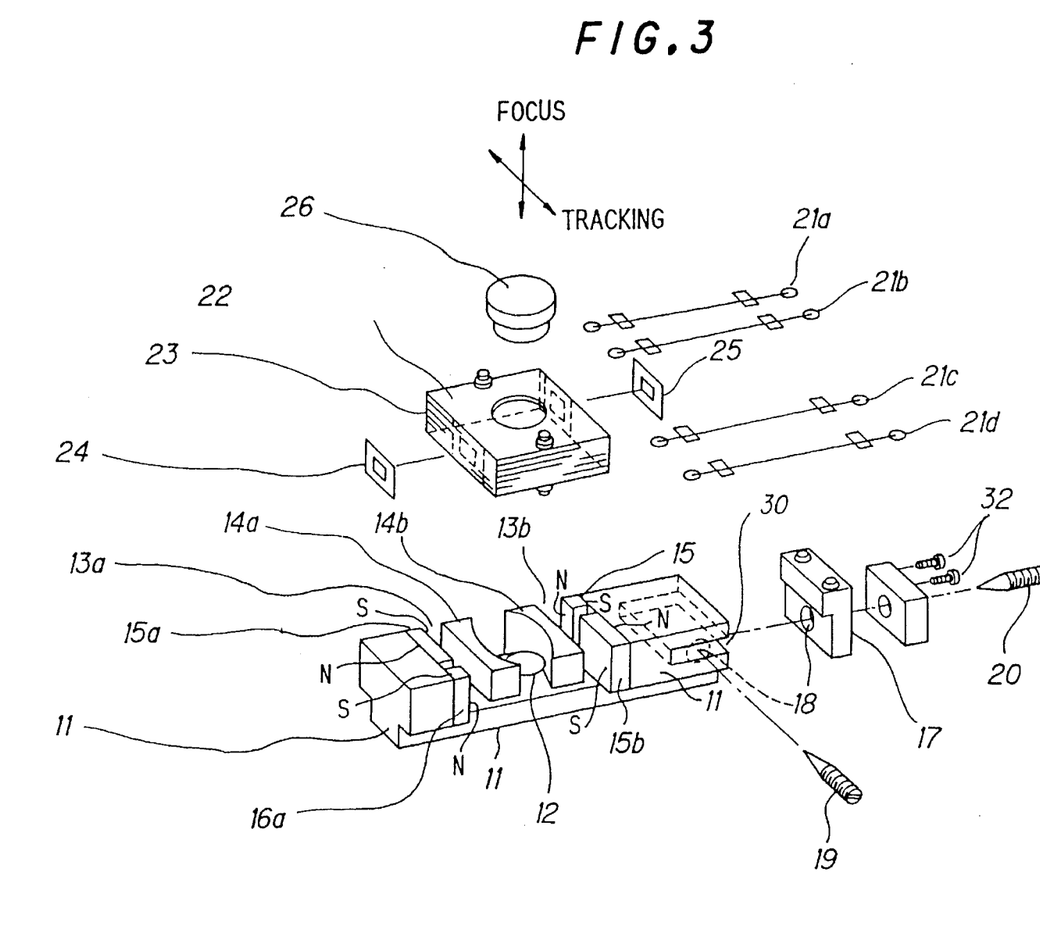
FIG. 3 is a disassembled and perspective diagram showing an actuator for an objective lens in a preferred embodiment according to the invention.

In an upper portion of FIG. 3, the focus and the tracking drive directions are shown by two arrows respectively. A lens holder 22 is approximately rectangular-shaped and holds the objective lens 26 at its center. A focus drive coil 23 is wound around the outer periphery of the lens holder 22. A pair of tracking drive coils 24 and 25 are rectangular-shaped and fixed to opposite sides of the focus drive coil 23 near around apexes, such that the arrangement of these coils is line symmetrical with respect to the axis of the objective lens 26. An actuator base 11, which supports various elements thereon, is made of magnetic material, and is a part of magnetic circuit. Rectangular-parallelepiped portions at both ends are also involved in the actuator base 11. A collimator beam 31 passes a circular aperture 12 set on the actuator base 11 as shown in FIG. 5B. 15a and 15b are plate magnets magnetized in the depth direction with opposite polarities. 16a and 16b are bar magnets magnetized in the depth direction with opposite polarities. The polarities of magnetization of the plate magnet 15a and the bar magnet 16a are opposite to each other.

These magnets compose a linear array as shown in FIG. 3. The similar relations hold also between the plate magnet 15b and the bar magnet 16b. These magnet arrays are arranged to be line symmetrical with respect to the axis of the objective lens 26. 14a and 4b are flux guides (magnetic flux guide members) with low magnetic reluctances and slightly shorter lengths than those of said opposite sides of the focus drive coil 23. Lower ends of flux guide 14a and 14b are fixed to the actuator base 11. 13a and 13b are magnetic gap and conductors of focus drive coils 23 and tracking drive coils 24 and 25 are positioned in these places when assembled.

The lens holder 22 are supported by four leaf springs 21a to 21d. The right and the left ends of these leaf springs are fixed to the lens holder 22 and a stand 17 respectively, by mean of adhesive or soldering. The stand 17 is fixed to the actuator base 11 by fixing screws 32.

Figure 6:
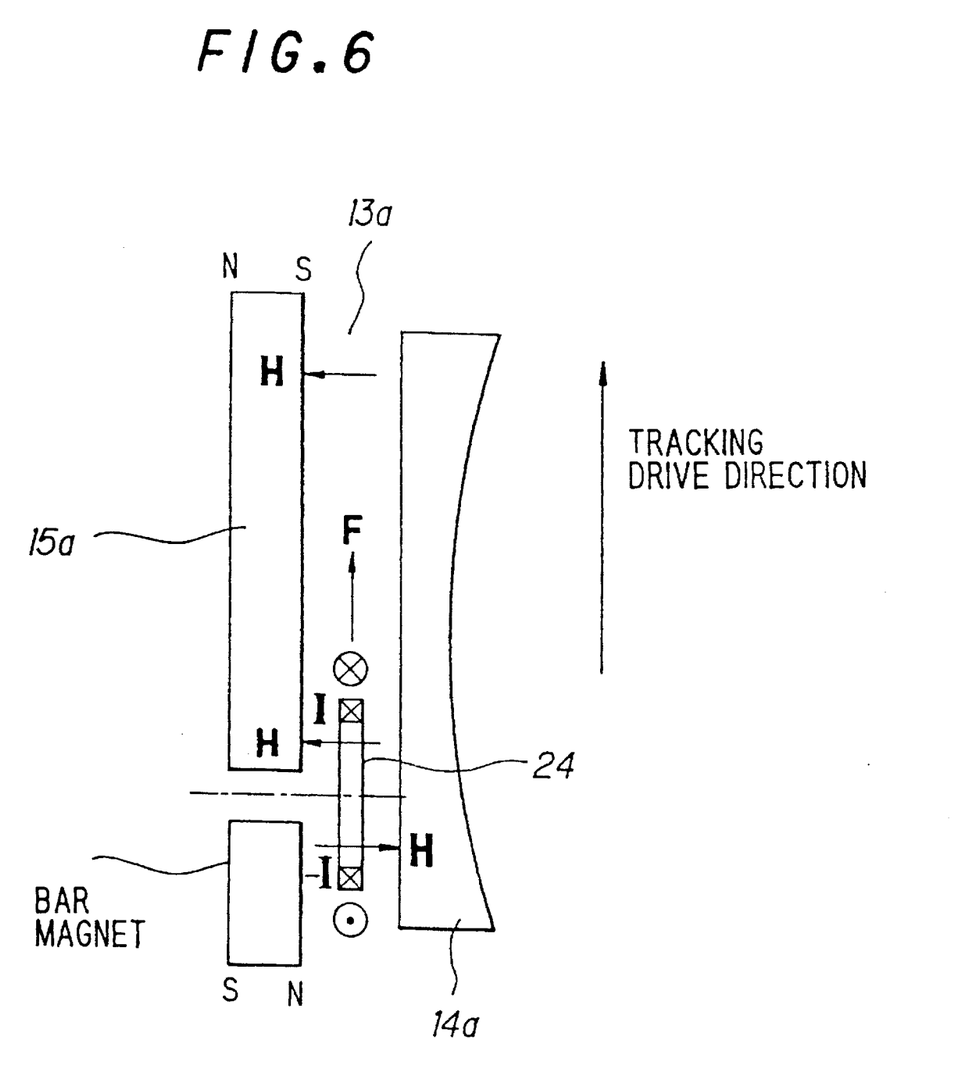
FIG. 6 shows relations between magnetic fields, electric current and the electro-magnetic force acting to the tracking drive coil.

Next, forces act to coils will be explained. FIG. 6 is a cross sectional view which shows the relation between the magnetic field distribution in the magnetic gap 13a and the electro-magnetic force acting to the tracking drive coil 24. The focus drive coil 23 is not shown for simplicity. The chain line is a bisector line of the space between the lower end of the plate magnet 15a and the upper end of the bar magnet 16a, and its extension line intersects the bisector of the tracking drive coil 24. The magnetic field H in the magnetic gap 13a is shown as vectors in FIG. 6, and is perpendicular to surface planes and has nearly equal magnitude, because magnitude of magnetization is uniform all over surfaces of magnets. The polarity of magnetization, however, is inverted in the bar magnet 16a, the direction of magnetic field in the vicinity of this magnet is also inverted as shown in FIG. 6. On the other hand, the coil current in this region is -I, therefore the electro-magnetic forces acting to upper and lower currents in FIG. 6 point to the same direction, namely the tracking drive directions, according to the Fleming's left hand law. The magnetic field near by the tracking drive coil is largely increased as compared with that in the case of FIG. 2D because of the flux guide 14a which covers whole area of the tracking drive coil 24. The same result can be obtained in the tracking drive coil 25, therefore the satisfactory drive sensitivity can be achieved in the tracking drive.

In the case of focus drive coil, all situations are quite similar to the case of FIG. 2B, except the existence of the bar magnets 16a and 16b, which decrease the electro-magnetic force in the focus drive direction to a small extent, and therefore the detailed explanations will be omitted.

Figure 4A:
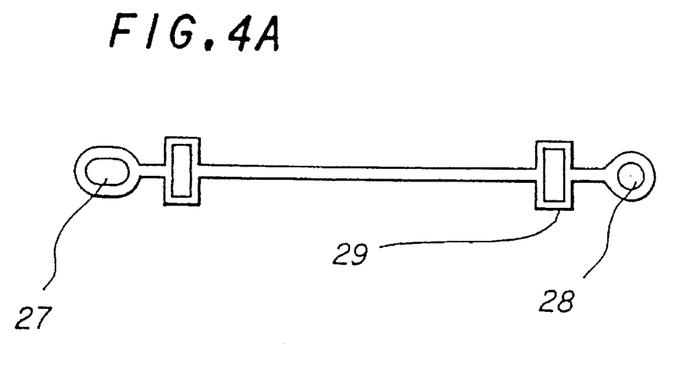
FIGS. 4A to 4C are plan views of the one of four leaf springs under various conditions.
Figure 4B:
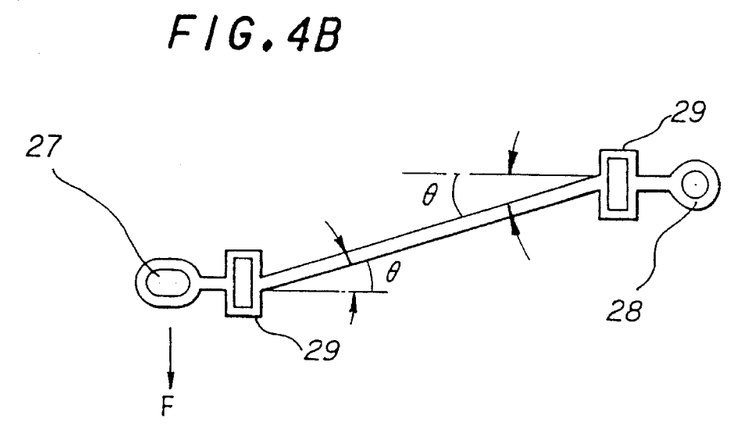
Figure 4C:
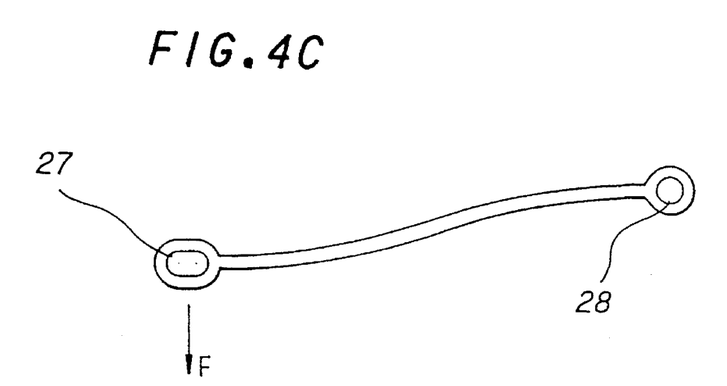

FIG. 4A shows one of leaf springs 21a to 21d in the case of no external force. The left end and the right one of each spring have an elliptical hole 27 and a circular one 28 respectively. These leaf springs are made of metal and have high reliability as compared with conventional ones made of plastics. The position and the attitude of the lens holder 22, which is supported by four leaf springs 21a to 21d, relative to the stand 17 is established by jigs, and elliptical hole 28 is used as play in this work. Near the both ends of the leaf spring, there are rectangular shaped frames, by which stiffness of the spring is increased at these portions. The spring is smoothly bent not only in the normal direction (the focus drive direction) but also in the lateral direction (the tracking drive direction). FIG. 4B shows the situation of a common spring without the frames under the same condition as that of FIG. 4B.

In a leaf spring according to the invention, compliance is larger, and linear relation between stress and strain holds in wide range of forces especially of lateral force.

Figure 5A:
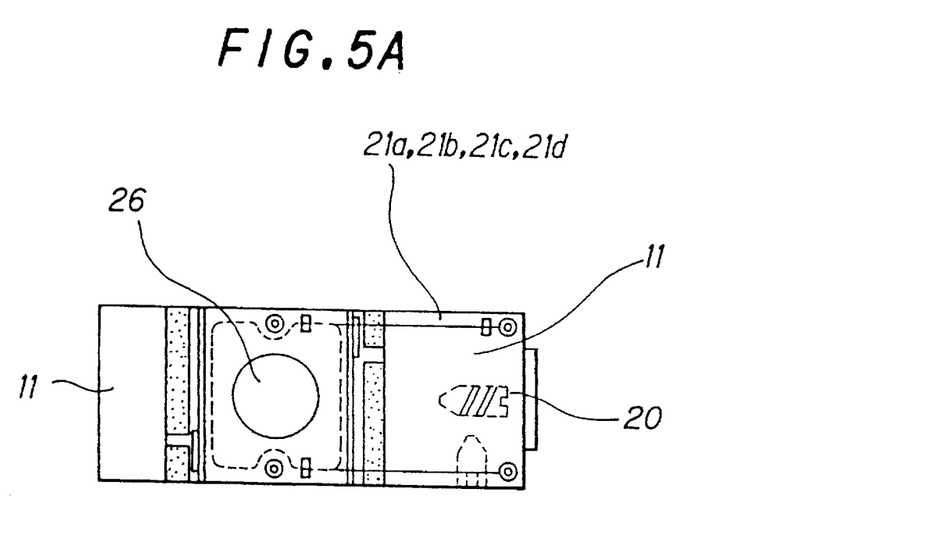
FIGS. 5A to 5C are a plan, an elevation and a side views of an embodiment according to the invention shown in FIG. 3.
Figure 5B:
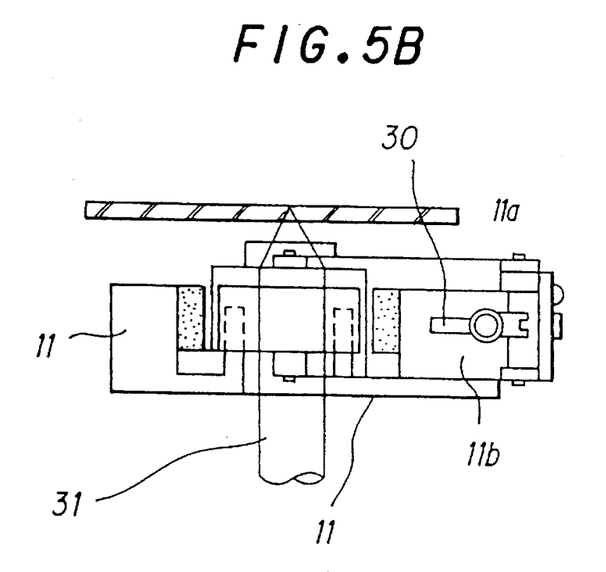
Figure 5C:
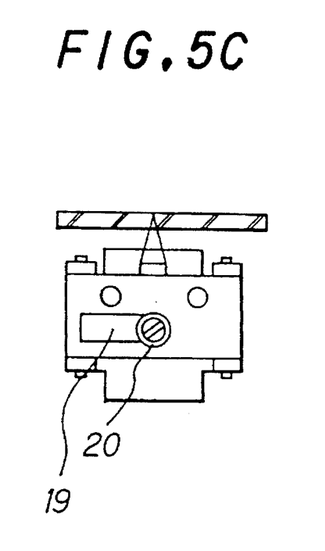

The assembled actuator is shown in FIGS. 5A to 5C, which are plan, elevation and side views respectively. 31 is a parallel beam by light collimated by a collimator lens (not shown), which passes through the circular aperture 12 and is focused by the objective lens 26.

Figure 7:
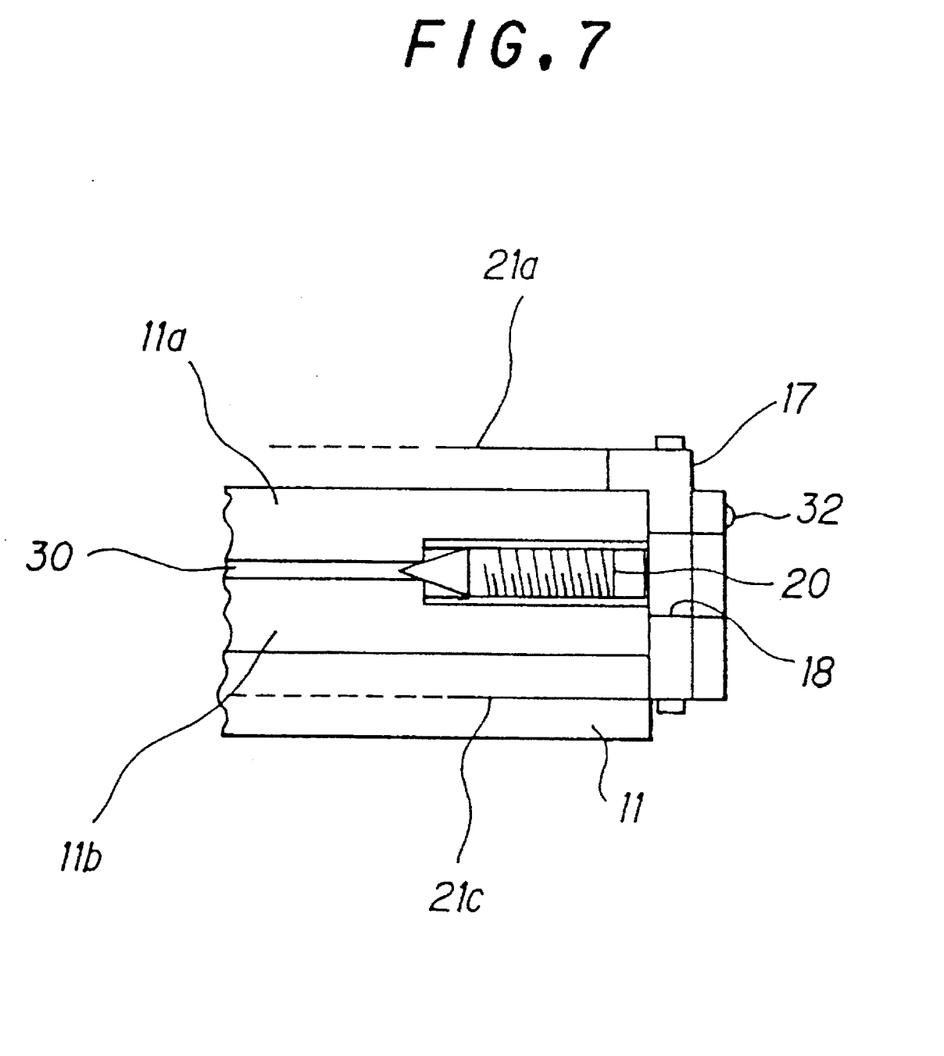
FIG. 7 shows the mechanism for adjusting the inclination of the lens holder in the tangential direction.

The actuator base 11 has a rectangular-parallelepiped portion near its rear end, which is provided with a rectangular-shaped thin air gap 30, and the upper and the lower portions are denoted by 11a and 11b respectively. The stand 17 is fixed to the upper portion 11a by fixing screws 32. 19 and 20 are needle screws with cone-shaped leading ends. The leading-ends of the needle screws 19 and 20 thrust into the air gap 30, and expand its gap-distances, and thereby adjust inclinations of the stand 17 in both the tracking drive and the tangential directions respectively and independently. For more detailed explanations, FIG. 7 shows the cross sectional view of the rear end of the actuator base 11. A female screw is provided in the rear end of the actuator 11, which guides the needle screw 20 into the inner region. This screw 20 is driven or loosened by a driver through a hole 18. The configuration surrounding the needle screw 19 is quite similar to that of the needle screw 20. The inclinations of the stand 17 are transmitted to the lens holder 22 through four leaf springs 21a to 21d.

In the above explanations, the tracking drive coil 24 and 25 are rectangular shaped. But similar effects can be achieved by any coil with line symmetrical shape, such as circular or elliptical one.

As described above, in the actuator for the objective lens according to the invention, movements of the lens holder are pure translation motions in both the focus drive and the tracking drive directions, because of metallic leaf springs with high reliability, and the stability of the objective lens is largely improved. The drive sensitivity in the tracking drive direction is increased by improving the configuration of driving coils and magnetic circuits. Initial adjustments of inclinations of the lens holder are simplified, and various problems concerning manufacturing processes can be solved.

Although the invention has been described with respect to specific embodiments for complete and clear disclosure, the appended claims are not to be thus limited but are to be construed as embodying all modification and alternative constructions that may occur to one skilled in the art.

What is claimed is:

1. An actuator for an objective lens, comprising:

a rectangular-shaped lens holder holding an objective lens at its center, a focus drive coil wound around outer periphery of said lens holder, and generating magnetic flux in a direction of focus drive, pair of tracking drive coils fixed to opposite sides of said focus drive coil near apexes, such that said tracking coils are line symmetrical with respect to axis of said objective lens and generate magnetic flux in a tangential direction perpendicular to both said focus drive direction and a tracking drive direction, four parallel leaf springs one end of each being fixed to said lens holder and another end of each being fixed to a stand, magnetic circuit assembly including permanent magnets and low magnetic reluctance members, and generating a static magnetic field in circumference of said lens holder and coils, an actuator base supporting said magnetic circuit assembly and said stand, such that said four leaf springs can adjust inclination of said lens holder in both tracking drive and tangential directions, wherein, said static magnetic field is line asymmetrical with respect to said lens axis, and in regions close to said opposite sides of said focus coil, is in said tangential direction and its magnitude is nearly constant along said opposite sides, however, its direction is inverted at bisectors of said tracking drive coils, and said low magnetic reluctance members and permanent magnets hold said opposite sides of said focus drive coil between them.

2. An actuator for an objective lens according to claim 1, wherein:

said tracking drive coils are rectangular shaped.

3. An actuator for an objective lens according to claim 1, wherein said permanent magnets include two linear arrays of a plate magnet and a bar magnet which are magnetized in axial directions with opposite polarities, and said linear arrays are positioned close to and in parallel with said opposite sides of said focus drive coil respectively, such that said two arrays are line symmetrical with respect to said axis of said objective lens.

4. An actuator for an objective lens according to claim 1, wherein:

said actuator base has rectangular-parallelepiped-formed portion about its rear end, and is provided with a thin and rectangular-shaped air gap running in parallel with its base plane, and said stand is fixed to an upper portion of a rectangular portion of said rectangular-parallelepiped-formed portion, and a width of said air gap is adjustable by the aid of two needle screws directed in tracking drive and tangential directions respectively.

5. An actuator for an objective lens, comprising:

a lens holder for holding said objective lens;

focus and tracking drive coils mounted on said lens holder, wherein the tracking drive coil comprises first and second flat and rectangular coils provided on the focus coil to be positioned opposite to one another relative to a central axis of the lens holder;

a magnet assembly provided on a base, said magnet assembly generating magnetic fields in opposite directions which are applied to two opposite sides of the first and second flat and rectangular coils, and said magnetic fields interacting with a magnetic flux generated by an energized coil of said focus and tracking drive coils, thereby generating at least one of focus and tracking forces acting on said lens holder; and a spring assembly for resiliently supporting said lens holder on said base;

wherein said spring assembly, comprises: a pair of first parallel springs each having a predetermined length, and first and second ends; and a pair of second parallel springs each having said predetermined length, and first and second ends; said first ends of said first parallel springs being fixed to first and second points on a top plane of said lens holder, said first ends of said second parallel springs being fixed to first and second points on a bottom plane of said lens holder, said first and second points on said top and bottom planes being positioned opposite relative to said central axis of said lens holder, said second ends of said first and second parallel springs being fixed to first to fourth points of said base.

6. An actuator for an objective lens, comprising:

a lens holder for holding said objective lens;

focus and tracking drive coils mounted on said lens holder;

a magnet assembly provided on a base, said magnet assembly generating magnetic fields in opposite directions, and said magnetic fields interacting with a magnetic flux generated by an energized coil of said focus and tracking drive coils, thereby generating at least one of focus and tracking forces acting on said lens holder; and a spring assembly for resiliently supporting said lens holder on said base;

wherein said focus drive coil is on a circumferential outer surface of said lens holder;

said tracking drive coil comprises first and second flat and rectangular coils provided on said focus coil to be positioned opposite relative to a central axis of said lens holder; and said magnet assembly consists of first and second magnets positioned opposite relative to said central axis, each of said first and second magnet consisting of a wide magnet and a narrow magnet, said narrow magnet facing a half portion of a corresponding one of said first and second flat and rectangular coils, while said wide magnet facing a remaining half portion of said corresponding one and a portion of said focus coil.

* * * * *